Nov. 22, 1927.

J. M. McCLATCHIE 1,650,373

MANUFACTURE OF CONDENSED LIQUIDS

Filed April 8, 1925   3 Sheets-Sheet 1

John Milton McClatchie
INVENTOR

BY Cooper, Kerr & Dunham
ATTORNEY

Nov. 22, 1927.
J. M. McCLATCHIE
1,650,373
MANUFACTURE OF CONDENSED LIQUIDS
Filed April 8, 1925  3 Sheets-Sheet 2
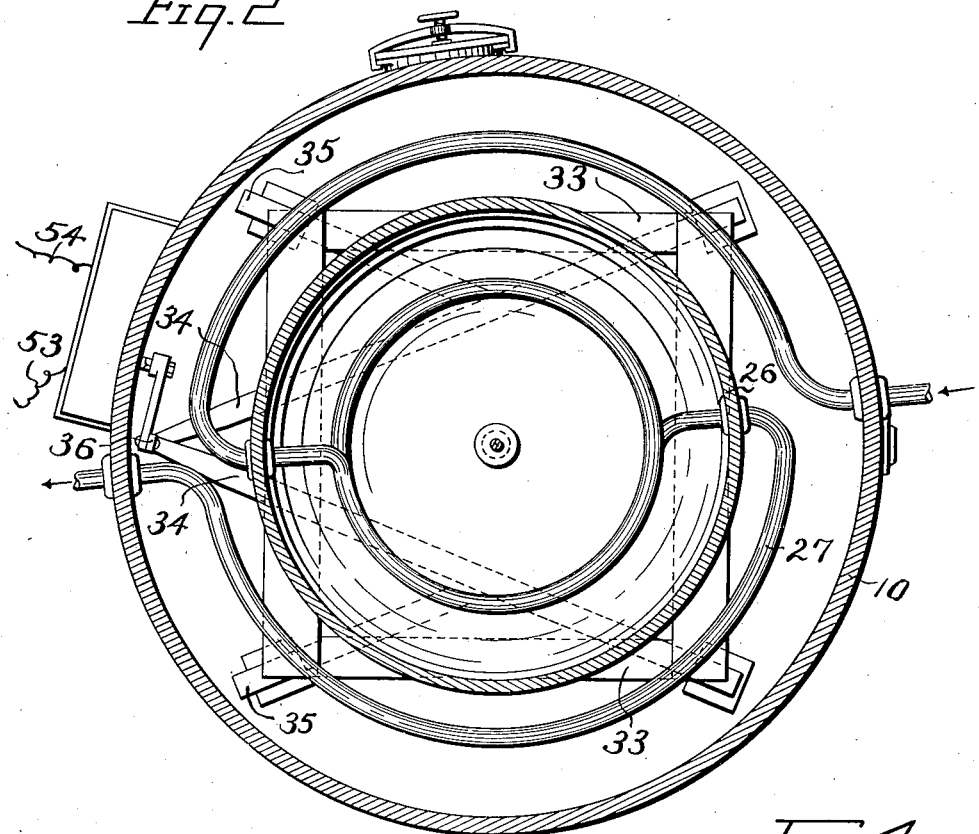
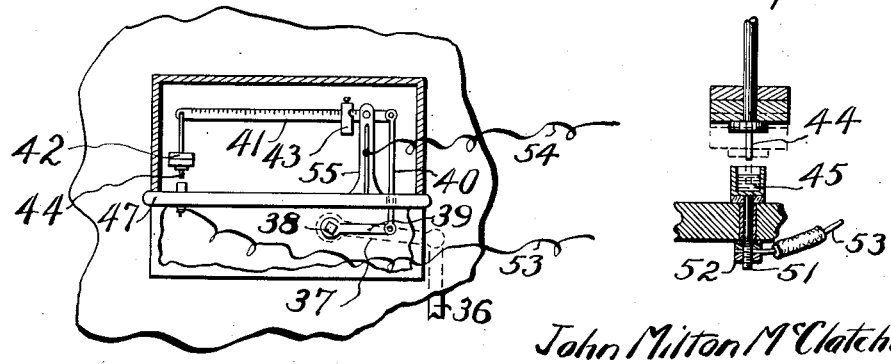
John Milton McClatchie
INVENTOR
BY Cooper, Kerr & Dunham
ATTORNEY Patented Nov. 22, 1927.

1,650,373

UNITED STATES PATENT OFFICE.

JOHN MILTON McCLATCHIE, OF NEW YORK, N. Y., ASSIGNOR TO THE BORDEN COMPANY, OF NEW YORK, N. Y., A CORPORATION OF NEW JERSEY.

MANUFACTURE OF CONDENSED LIQUIDS.

Application filed April 8, 1925. Serial No. 21,570.

This invention relates to methods of and apparatus for condensing liquids and has particular reference to improvements in processes and apparatuses of the type in which a vacuum is employed.

A broad object of the invention is to provide a process and apparatus therefor which may be run continuously for a working day or other period, and which will produce and deliver a finished product under conditions minimizing the chances of contamination. The construction of the apparatus, one form of which is shown in the drawings, is such that after the apparatus has once been sterilized and placed in operation it need not be stopped for another sterilization until the day's run is completed. This is a particularly desirable feature in systems where a vacuum is employed, as it makes it unnecessary to break the vacuum after each batch of milk has been worked upon in order to permit sterilization before a new batch is started. This obviously relieves the mechanism for maintaining the vacuum of a great deal of work.

Another object of the invention is to provide an improved evaporating pan of the vacuum type. The improvement comprises an open pan in a chamber much larger than the pan and from which the air is exhausted, as distinguished from a vacuum pan fitted with a cover which is only large enough to close the top of the pan. It has been found that the improved method of evaporating has many advantages, among which is the fact that a much more uniform temperature can be maintained because of the much greater space surrounding the pan. It is generally conceded by those having the experience that a variation in temperature means a variation in the viscosity of the product and that if a constant temperature is maintained a much more uniform product will result. The improved pan also eliminates the present difficulty of losing milk because of its being caught up and taken over through the vacuum pump while the milk is undergoing ebullition. Another advantage is that a considerable saving of fuel is effected, owing to the fact that the pan is operated under substantially the same condition as it would be if it were operated in a very large thermos bottle. There can, therefore, be little transmission of heat in either direction to or through the wall of the vacuum chamber and this condition may be further improved upon by heat insulating the wall.

Another object is to provide a vacuum apparatus which is so constructed that in case air leaks in through the walls of the vacuum chamber or around the pipes and other fittings entering the chamber, the air will not pass through the fluid which is being operated upon within the chamber. This contributes materially to the successful prevention of contamination of the product.

Another object is to provide a construction whereby in a system employing several pans or work tanks, the connections or conduits between the pans or tanks are all within and at a substantial distance from the walls of the vacuum chamber and if air leaks in it can have no such harmful results which might follow if the connections were exposed to the usual atmospheric surroundings.

Still another object is to provide an improved and highly satisfactory mechanism for regulating one or more operations, particularly operations within a vacuum or other enclosed chamber. In the present embodiment this improvement is in the form of a weighing scale supporting the evaporating pan and is controlled from the exterior of the vacuum chamber. This scale may be used to show when the pan has received as much milk as it should contain and the load offsetting weights or other control may then be so adjusted that when the contents of the pan have been lightened by the evaporation, the scale will operate a signal, preferably an electrical signal, indicating that the batch of milk in the pan has been condensed to the required consistency and that further condensation should be prevented. This broad idea is capable of use generally with evaporating pans, as it affords a very convenient way of "striking a batch" without relying to such a great extent upon the skill and experience of a workman.

With the foregoing and other objects in view, the invention comprises, among other things, a novel construction and relation of parts, the essential features of which are pointed out in appended claims, and a preferred form of embodiment of which is shown in the drawings accompanying and forming a part of the specification. Of said drawings;

Fig. 2 is a section on the line 2—2 of Fig. 1.

Fig. 3 is a view of part of the weighing mechanism and electrical connections controlled by said mechanism.

Fig. 4 shows details of the devices whereby electrical contact is made when the scale beam reaches a certain position.

Figure 1:
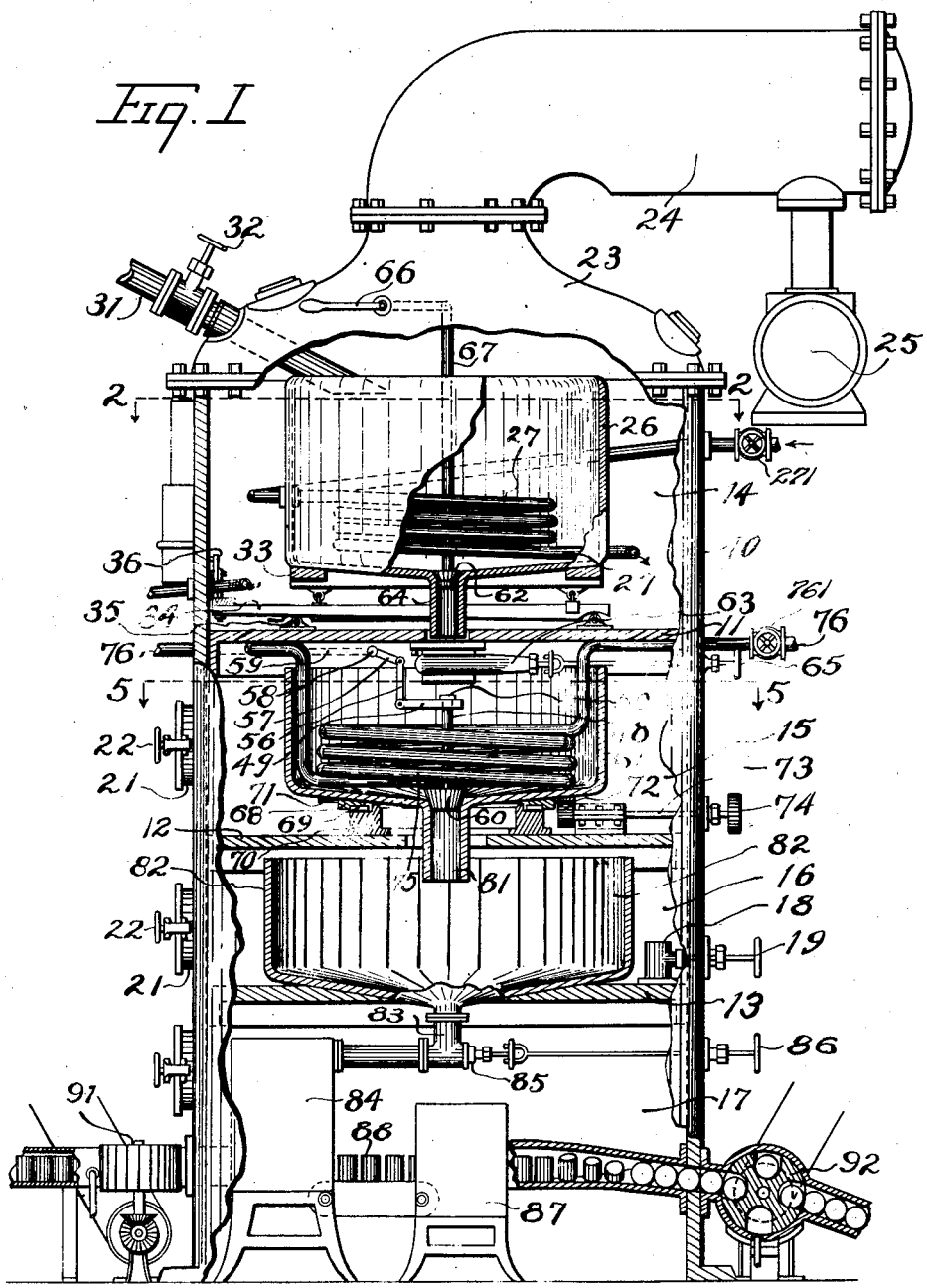
Fig. 1 is an elevation of one form of the improved apparatus with part of the shell or casing broken away and certain of the parts shown in section.
Figure 5:
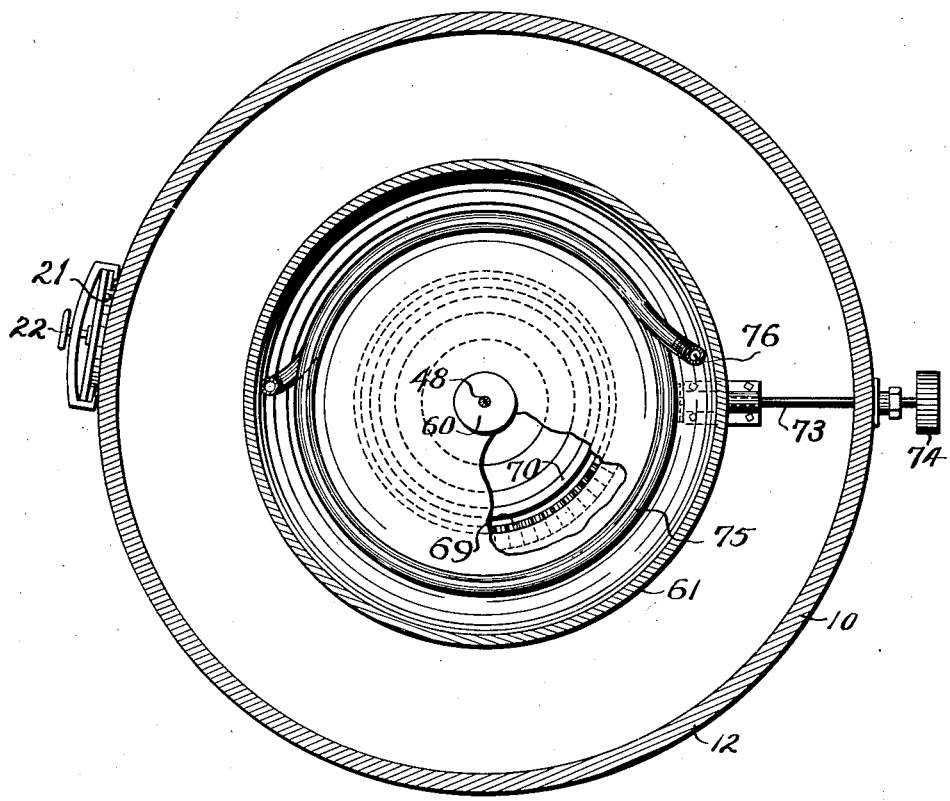
Fig. 5 is a section on the line 5—5 of Fig. 1, with certain of the parts omitted for the sake of clearness.

The apparatus shown in the drawings comprises a cylindrical shell 10 which may be made of any desired material. While the shell is shown in the drawings as having a single wall, it may be a double wall with an air space or other insulation between the walls to prevent the transference of heat in either direction through the wall. The cylindrical shell may have several cross partitions or floors, such as shown at 11, 12, and 13, thereby forming within the shell four compartments 14, 15, 16 and 17. The partitions or floors may be air-tight with an air valve such as shown at 18, in each of them, with means comprising a handwheel 19 for operating the valve from the exterior of the casing 10. With this construction it is possible to establish a communication between the various compartments, so that when the air is exhausted from the shell as hereinafter explained, the partial vacuum thus created will be substantially the same at all points within the shell. By closing the valves 18 in any desired partition or partitions it is possible to cut off one or more of the chambers from the air exhaust or to maintain an exhaust in certain of the chambers when it is necessary to break the vacuum at a point within one or more of the other chambers. At several different points in the exterior of the shell are manholes 21 having tightly fitted covers held in place by the usual clamps 22. Passing through the shell at other points are various pipes and valve stems. A system of packing glands is employed which glands are designed to prevent the entrance of air into the cell, the idea being to have the cell as near air-tight at all points as it is possible to make it.

Connected to the top 23 of the shell is a condenser 24 which in turn is connected to a vacuum pump 25. This pump and condenser are of well-known construction and serve to create a partial vacuum within the shell 10 and condense the vapor arising from the evaporation of the milk.

The evaporation is carried on within the compartment 14 in an evaporating pan 26. This pan contains coils 27 through which steam or some other heating agency may be circulated. The pipes leading to the coils 27 are shown as extending through the wall of the shell 10 and through the sides of the pan 26. They are preferably made of a somewhat flexible material, but may pass over the top edge of the pan, the purpose of either construction being to permit a bodily up and down movement of the evaporator pan 26. The reason for this movement of the pan will be apparent later on.

Flow of steam or other agency through the coils 27 may be regulated or cut off by any suitable means such as a valve 271.

Extending through the top 23 of the shell is a conduit 31 leading to a tank or other source of supply for the milk or other material which is to be operated upon. A valve 32 is used to regulate the flow of milk into the apparatus.

The evaporating pan 26 is supported by a rectangular frame 33, Figs. 1 and 2, which forms substantially the load platform of a weighing scale of the compound lever type. The system of levers comprises the usual two long converging levers 34 and the ordinary two short levers 35 having a pivotal connection, not shown, with points intermediate the ends of the long levers 34. This compound lever construction is old and well known and need not be described in detail. At the point where the long levers come together they connect with a rod 36 pivoted at its upper end to an arm 37 secured to a rock shaft 38 rotatably supported in the shell 10. Secured to the rock shaft 38 and on the exterior of the shell is an arm 39 connected by a link 40 to one end of a scale beam 41. This scale beam supports at its other end the usual means for receiving unit load offsetting weights 42 and mounted on the beam is the usual sliding load off-setting device 43. The support for the unit weights is extended as shown at 44, Figs. 3 and 4, to form a contact point normally suspended above a cup 45 containing mercury or acidulated liquid. The cup 45 is mounted on a fixed supporting bar or plate 47, and is insulated from said support. Extending from the cup through the insulation upon and in the support is a rod 51 threaded to receive the usual binder nut 52 holding one end of a circuit wire 53. A corresponding wire 54 is attached to the support 55 for the scale beam, which support is mounted upon or forms a part of the supporting plate 47 previously mentioned.

The wires 53 and 54 may be extended to any desired point where a signal should be given that the apparatus needs attention from the workman in charge of it. This signal may be a bell, a buzzer, or a light.

So far as described, the apparatus is substantially an improved vacuum pan. After the interior of the chamber or shell has been sterilized ready for the beginning of operations, the vacuum pump 25 is started to exhaust the air from the interior of the shell 10. The valve 32 is then opened to allow milk to flow into the evaporating pan 26 and the weights on the scale beam 41 may be used to determine when the pan has been filled to its intended capacity. The evaporating agency is then admitted through the coils 27 to start the heating and evaporating of the contents of the pan. The capacity of the pan may be in effect increased by leaving the valve 32 open for awhile just far enough for a quantity of milk to flow into the pan sufficient to offset the evaporation and the valve then closed. It is better practice, however, to simply allow the milk to run until the weighing scale indicates that the capacity of the pan has been reached and then close the valve. As the contents of the pan are evaporated, their weight, of course, decreases, and as it reaches a certain point the weights or load offsetting devices on the scale beam become effective to move the beam downward and close the contacts 44 and 45 to call the man in charge. He then shuts off the supply of steam through the coils 27, if an automatic cut-off is not used, and opens valves whereby the condensed contents of the pan 26 are allowed to run from the pan into a cooling tank 61 in the compartment 15. This involves operating a plug valve 62 in the bottom of the evaporating pan 26 and a gate valve 63 attached to the under side of the partition 11 and having its opening in alignment with a tubular spout 64 on the bottom of the evaporating pan. In emptying the pan 26 the gate valve is first opened by turning the hand wheel 65 on the exterior of the casing and then operating the lever 66 and connections extending through the top 23 of the shell to lift up the rod 67 of the plug valve.

The cooling tank 61 is supported by a circular frame 68 and friction rollers 69 of any desired type resting upon a circular track 70 supported by the partition 12. Rigid with the tank and frame 68 is a circular rack 71 meshing with a pinion 72 attached to a shaft 73, extending through the shell 10. At its outer end the shaft 73 carries a gear or pulley 74 by means of which connections may be made to any suitable source of power. Extending over the top and into the interior of the cooling tank 61 is a system of cooling coils 75 having inlets and outlets 76 extending through the shell 10. Valves such as shown at 761 may be used to control or shut off circulation of the cooling medium through the coils 75. After the condensed milk has been allowed to run into the cooling tank 61 power is applied at 74 to rotate the tank around the cooling coils thereby effecting an agitation and cooling of all parts of the liquid. After the milk has been thoroughly agitated and cooled a plug valve 60 is opened and the milk allowed to escape through a spout 81 extending into a storage tank 82 supported in the compartment 16. This storage tank or receptacle may be large enough to receive several batches of milk from the condensing and cooling devices. The bottom of the storage receptacle is equipped with an outlet 83 leading to a filling machine 84 within the compartment 17. The outlet from the storage tank is controlled by a valve 85 as well as by the usual valves, not shown, of the filling machine. The valve 85 may be operated from the interior of the compartment 17, but is suitably connected to a hand wheel 86 so that the valve may be operated from the exterior of the shell 10.

The plug valve 60 in the cooling tank 61 comprises a rod 48 having a reduced portion journaled in a bar 49 and a head 50 above the bar. At its other end the bar is connected by a link 56 to an arm 57 attached to a rock shaft 58 extending through the shell 10. At its outer end the rock shaft 58 is provided with a lever shown in dotted outline at 59, in Fig. 1, and much like the lever 66 for operating the plug valve in the evaporating pan 26.

The compartment 17 also contains a sealing or soldering machine 87 for sealing containers 88 delivered from the filling machine 84. Passing through the filling machine 84 and sealing machine 87 is a traveling carrier for the containers. The containers are inserted into the casing or shell 10 through an air lock 91 and are withdrawn through an air lock 92 thereby allowing the containers to enter and be delivered from the shell after sealing without materially impairing the vacuum within the shell 10. The specific form of filling and sealing machines forms no part of the present invention and they are not, therefore, shown and described in detail.

The known art contains a number of machines which may be used for the purpose.

The novel process may be practiced in whole or in various of its parts with the aid of apparatus other than that specifically shown and described. The specific apparatus is an illustrative embodiment admirably adapted to fulfill the objects primarily stated, but is capable of various modifications and changes all coming within the scope of the claims which follow.

What is claimed is:

1. An apparatus for manufacturing condensed milk comprising an air tight chamber, means for exhausting air from said chamber, means within said chamber for evaporating, cooling and agitating milk while within the chamber, and means for thereafter withdrawing the resulting condensed milk product, all without breaking the vacuum in the chamber.

2. An apparatus for manufacturing condensed milk comprising an air tight chamber, means for exhausting air from said chamber, means open to the air remaining in said chamber for evaporating, cooling, agitating and temporarily storing the milk within the chamber, and means for thereafter withdrawing the resulting condensed milk product from the chamber in containers without substantial impairment of the air exhaustion in said chamber.

3. An apparatus for manufacturing condensed milk comprising an air tight cell and devices for exhausting air from said cell, means within the cell for evaporating, cooling and agitating milk within the cell, devices for thereafter withdrawing the finished product from the cell without releasing the vacuum in the cell, means whereby the operation of the air exhausting devices will draw a fresh supply of milk into the cell, and a valve controlling the means last mentioned.

4. An apparatus for manufacturing condensed milk comprising an air tight cell and devices for exhausting air from said cell, means within the cell for condensing, agitating, cooling and temporarily storing the milk within the cell, means for closing an electric signal circuit controlled by the condensing means, and devices for removing the finished condensed milk product from the cell without impairment of the vacuum within the cell.

5. An apparatus for manufacturing condensed milk comprising an air tight chamber, means for exhausting air from said chamber, devices within the chamber and open to the partial vacuum created by the air exhausting means for condensing, agitating and cooling milk while in the vacuum chamber, filling and sealing devices operating in the vacuum within the chamber, and means comprising a valve whereby the vacuum around the filling and sealing devices may be broken without impairment of the air exhaustion in other parts of the chamber.

6. In an apparatus of the character described, the combination of an evaporator, a cooling apparatus, a storage tank, a normally sealed air tight shell enclosing the evaporator, the apparatus and the storage tank, devices for exhausting air from the shell, means for operating the evaporator and the cooling apparatus, and means for breaking the air seal at one or more points in the shell when desired.

7. In an apparatus of the character described, the combination of an evaporator, valve controlled devices for supplying milk and heat to the evaporator, a cooling apparatus, a storage tank and filling and sealing devices; of a normally sealed air tight shell enclosing said evaporator, cooling apparatus, storage tank and filling and sealing devices, means for exhausting air from said shell, means operated from the exterior of the shell for controlling the flow of milk to the evaporator through the cooling apparatus and storage tank to the filling and sealing devices, and means for breaking the air seal at one or more points on the shell.

8. In an apparatus of the character described, the combination of a normally sealed air tight shell and means for exhausting air from said shell, valve controlled devices for admitting air, heat and the liquid to be evaporated to the interior of the shell, evaporating, cooling, and filling compartments within the shell, and means controlled from the exterior of the shell for regulating the flow of the liquid through the evaporating and cooling compartments to the filling compartment.

9. In an apparatus of the character described, the combination of a normally sealed air tight shell and means for exhausting air from said shell, valve controlled devices for admitting air, heat and the liquid to be evaporated to the interior of the shell, evaporating, cooling, storage and filling compartments within the shell, and means operable from the exterior of the shell for regulating the flow of the liquid through the evaporating, cooling and storage compartments to the filling compartment.

10. In an apparatus of the class described; a shell, an evaporator, a cooling apparatus, a storage tank and a filling machine all located within said shell; partitions forming separate compartments for the evaporator, apparatus, tank and filling machine; and means comprising valves for admitting air to and exhausting it from said compartments.

11. In an apparatus of the class described; a shell; an evaporator, a cooling apparatus, a storage tank and a filling machine located in horizontal alignment within the shell; cross partitions forming separate compartments within the shell for the evaporator, apparatus, tank and filling machine; means comprising valves for admitting air to and exhausting it from said compartments; valves for controlling the flow of liquid through the evaporator, cooling apparatus, storage tank and filling machine; and devices whereby said controlling valves may be operated from the exterior of the shell.

12. In a device of the class described, the combination of a normally sealed air-tight chamber, of an evaporating pan, a cooling tank and a storage receptacle within said chamber, said pan, tank and receptacle being open to the air within the chamber, devices for exhausting air from the chamber, means controlled from the exterior of the chamber for regulating the flow of liquid through the aforesaid pan and tank to the receptacle, filling and sealing apparatus, and valve controlled means for regulating the flow of liquid from the storage receptacle to said apparatus.

13. In a device of the class described, the combination of a normally sealed air-tight chamber, and devices for admitting air to and exhausting it from said chamber, of an evaporating pan, a cooling tank and a storage receptacle within said chamber, said pan, tank and receptacle being open to the air within the chamber, means controlled from the exterior of the chamber for regulating the flow of liquid through the aforesaid pan and tank to the receptacle, a filling machine connected to the storage receptacle, a normally air tight compartment enclosing said machine, and means comprising an air valve for connecting and disconnecting said compartment and the aforesaid air-tight chamber.

14. In an apparatus of the character described, the combination of a normally sealed air-tight shell and means for exhausting air from said shell, evaporating, cooling, storage and filling devices within said shell, means comprising a valve for admitting to the evaporating device the liquid to be evaporated and heat for evaporating it; valve controlled connections for regulating the flow of the liquid through the aforesaid device, and means for operating said regulating valves from the exterior of the shell.

15. In an apparatus of the character described, the combination of a normally sealed air-tight shell and means for exhausting air from said shell, evaporating, cooling, storage and filling devices within said shell, means comprising a valve for admitting to the evaporating device the liquid to be evaporated and means for evaporating it, connections comprising valves for regulating the flow of the liquid through the aforesaid devices, means for operating said regulating valves from the exterior of the shell, and an air-lock in the shell adjacent the filling devices.

16. In an apparatus of the class described, the combination of a normally sealed air-tight-shell and means for exhausting air from said shell, evaporating, cooling, storage and filling devices within said shell, means comprising a valve for admitting to the evaporating device the liquid to be evaporated and means for evaporating it, connections comprising valves for directing and regulating the flow of the liquid through the aforesaid devices, means for operating the valves from the exterior of the shell, and means for supplying containers to the filling devices and withdrawing same after filling without impairment of the vacuum in the shell.

17. In an apparatus of the character described; the combination of an evaporating pan and means comprising a valve for supplying milk and heat to said pan, a cooling apparatus, means for conducting milk from the evaporating pan to the cooling apparatus, a storage tank, means for conducting and controlling the flow of milk from the cooling apparatus to the storage tank, a normally air-tight shell covering the evaporating pan, the cooling apparatus and the storage tank, devices for exhausting air from said shell, and a filling machine connected to and receiving milk from the storage tank.

18. In an apparatus of the character described, the combination of an evaporating pan and means comprising a valve for supplying milk and heat to said pan, a cooling apparatus, a storage tank, a normally air-tight shell enclosing the pan, the cooling apparatus and the storage tank, devices for exhausting air from the shell, devices comprising valves for conducting the milk from the evaporating pan to the cooling apparatus and thence to the storage tank, means whereby said valves may be operated from the exterior of the shell, a filling and sealing compartment, and a valve controlled outlet whereby the milk may be withdrawn from the storage tank and conducted to the filling and sealing compartment.

19. In an apparatus of the class described, the combination of an evaporating vessel for receiving milk and means comprising a valve for supplying milk and heat to said vessel, a cooling apparatus, means comprising a valve for conducting milk from the vessel to the cooling apparatus, power driven devices for operating the cooling apparatus to bring all of the milk in the apparatus to the same temperature, a storage receptacle, means comprising a valve for conducting milk from the cooling apparatus to the storage receptacle, an air-tight shell covering the vessel, the apparatus and the receptacle, devices for exhausting air from said shell, and a valve controlled outlet whereby the milk may be drawn from the storage receptacle.

20. In an apparatus of the class described, the combination of an evaporating vessel for receiving milk and means comprising a valve for supplying milk and heat to said vessel, a cooling apparatus comprising a rotatable tank and cooling coils extending into the tank, means comprising a valve for conducting milk from the vessel to the cooling apparatus, power driven devices for rotating the tank around the cooling coils to facilitate uniform cooling, a storage receptacle, means for conducting the cooled milk from the cooling apparatus to the storage receptacle, a valve controlled outlet from said receptacle, an air-tight housing covering the vessel the cooling tank and the storage receptacle, and devices for exhausting air from said housing.

21. In an apparatus of the class described, a shell; an evaporating pan, a cooling apparatus, a storage tank and a filling machine all located within said shell, a partition across the shell to form a separate compartment within the shell for the filling machine, an air valve in said partition, means for operating said valve from the exterior of the shell, a manhole in the shell whereby access may be had to the filling compartment, and a tightly fitted removable cover for said manhole.

22. In an apparatus of the class described, the combination of an evaporating pan for receiving milk and means comprising a valve for supplying milk and heat to said pan, a cooling apparatus, means comprising a valve for conducting milk from the pan to the cooling apparatus, power driven devices for operating the cooling apparatus to bring all of the milk flowing through the apparatus to a uniform temperature, a storage receptacle, means comprising a valve for conducting milk from the cooling apparatus to the storage receptacle, a filling machine connected to and drawing its supply of milk from the storage receptacle, a normally airtight shell, enclosing the pan, cooling apparatus, storage receptacle and filling machine, means comprising valves for exhausting air from and admitting it to the shell, a plurality of manholes in the shell, and tightly fitted removable covers for said manholes.

23. In an apparatus of the character described, the combination with an evaporating pan, of a weighing scale supporting the pan, and means for closing an electric signal circuit operated by the scale when the load thereon is reduced beyond a certain point by evaporation of the contents of the pan.

24. In an apparatus of the character described, the combination with an evaporating pan, of a weighing scale supporting the pan, means for closing an electric signal circuit operated by the scale when the load thereon is reduced beyond a certain point by evaporation of the contents of the pan, and adjustable load offsetting means for determining the weight required to operate the signal.

25. In an apparatus of the character described, the combination with an evaporating pan, of a platform scale supporting the pan and comprising a beam, means for closing an electric signal circuit operated by the scale beam when the weight on the platform is reduced beyond a certain point by evaporation of the contents of the pan, and adjustable weights on the scale beam for determining the operating point of the signal.

26. In an apparatus of the character described, the combination with an evaporating pan, of means for supplying milk and heat to the pan, a weight responsive device supporting the pan, and means for operating a signal controlled by said device when the load thereon is reduced beyond a certain point by evaporation of the contents of the pan.

27. In an apparatus of the character described, the combination with an evaporating pan, of a weight responsive device supporting the pan, means for supplying milk and heat to the pan, means for operating a signal controlled by said device when the load thereon is reduced beyond a certain point by evaporation of the contents of the pan, and manually adjustable devices for determining the point at which the signal shall be operated.

28. In a vacuum pan, weight responsive devices within the cover of the pan and controlled by the liquid in the pan, manually adjustable controlling devices on the exterior of the cover, connections whereby the manually adjustable devices control the weight responsive devices, and means for operating an electric signal controlled by the weight responsive devices.

29. In a vacuum pan, weight responsive devices within the cover of the pan and controlled by the liquid in the pan, adjustable load offsetting devices on the exterior of the cover, and means for operating an electric signal controlled by the load offsetting devices.

30. In a vacuum pan, comprising a cover and a receptacle for the liquid to be evaporated, devices whereby variation of the amount of liquid in the receptacle effects movements of the receptacle to different positions, means for closing an electric signal circuit automatically operated when the receptacle reaches one of its positions, and means on the exterior of the cover for predetermining the amount of liquid necessary to move the receptacle to said position.

31. The combination with a series of open top pans wherein milk is successively condensed, agitated, cooled and temporarily stored, of a cylindrical casing surrounding said pans, means controlled from the exterior of the casing for supplying milk, heat, and a cooling agency to and regulating the flow of milk successively through said pans, devices driven from the exterior of the casing for effecting the agitation of the contents of one of the pans, and devices for exhausting air from the casing.

32. The combination with a series of open top pans wherein milk is successively condensed, agitated, cooled and temporarily stored, of a vertically disposed cylindrical casing surrounding said pans, means controlled by valves for supplying through the casing the milk to be condensed and the evaporating and cooling agencies therefor, connections for conducting the milk from pan to pan, devices driven from a source of power exterior of the casing for effecting the agitation of the milk, devices for exhausting air from the casing, and means for delivering at a point exterior of the casing the finished condensed milk product.

33. The method of condensing and canning milk which comprises successively condensing, agitating, cooling the milk and filling and sealing the cans within a shell in which a substantially uniform vacuum condition is maintained and withdrawing the sealed cans without impairment of the vacuum.

34. The method of condensing and canning milk which comprises condensing and cooling the milk, introducing the milk into cans and sealing it therein all within a shell in which a substantially uniform vacuum condition is maintained, and withdrawing the sealed cans without impairment of the vacuum.

In testimony whereof I hereto affix my signature.

JOHN MILTON McCLATCHIE.